Dec. 26, 1922.

M. P. HOLMES.
ROTARY ENGINE
FILED APR. 18, 1918.

Inventor:
Morris P. Holmes.
by
atty.

Dec. 26, 1922.                                                                 1,440,265
M. P. HOLMES.
ROTARY ENGINE
FILED APR. 18, 1918                                              2 SHEETS-SHEET 2

Inventor:
Morris P. Holmes.
by
atty.

Patented Dec. 26, 1922.

1,440,265

UNITED STATES PATENT OFFICE.

MORRIS P. HOLMES, OF CLAREMONT, NEW HAMPSHIRE, ASSIGNOR TO SULLIVAN MACHINERY COMPANY, A CORPORATION OF MASSACHUSETTS.

ROTARY ENGINE.

Application filed April 18, 1918. Serial No. 229,381.

*To all whom it may concern:*

Be it known that I, MORRIS P. HOLMES, a citizen of the United States, residing at Claremont, in the county of Sullivan and State of New Hampshire, have invented certain new and useful Improvements in Rotary Engines, of which the following is a full, clear, and exact specification.

My invention relates to rotary engines.

It has heretofore been proposed to regulate a rotary engine of the type utilizing a single set of intermeshing spiral toothed rotors by means of an adjustable throttle valve disposed at one end of the rotors and controlling the supply of fluid to the teeth at their point of contact. It has, further, been proposed to supply fluid to a rotary engine of the type utilizing a plurality of sets of spiral rotors by disposing between the adjacent ends of the elements of each rotor meshing spur gears, and supplying the fluid to the rotors at the point of mesh of the spur gears.

One object of my invention is to provide an engine of the rotary type having rotor controlled inlet port means and in which the period of admission is variable. A further object of my invention is to provide an engine having rotors provided with intermeshing tooth blades forming pockets which increase in volume as said rotors rotate and having means for varying the period of admission.

My invention also has for its object to control the cut-off of a rotary engine of the type utilizing a plurality of sets of intermeshing spiral toothed rotors in an improved manner, whereby the cut-off of the several sets may be regulated in an improved and simplified manner at the same time that the construction is balanced as desired. More specifically, my invention has for its object to provide an improved and simplified construction of rotors and an improved and simplified construction of variable cut-off mechanism therefor and cooperating therewith whereby the fluid supply to either set of rotors may be regulated as desired simultaneously with the fluid supply to its fellow. These and other objects of my invention will, however, hereinafter more fully appear.

In the accompanying drawings, I have shown for purposes of illustration one embodiment which my invention may assume in practice.

In these drawings,—

Figure 1:
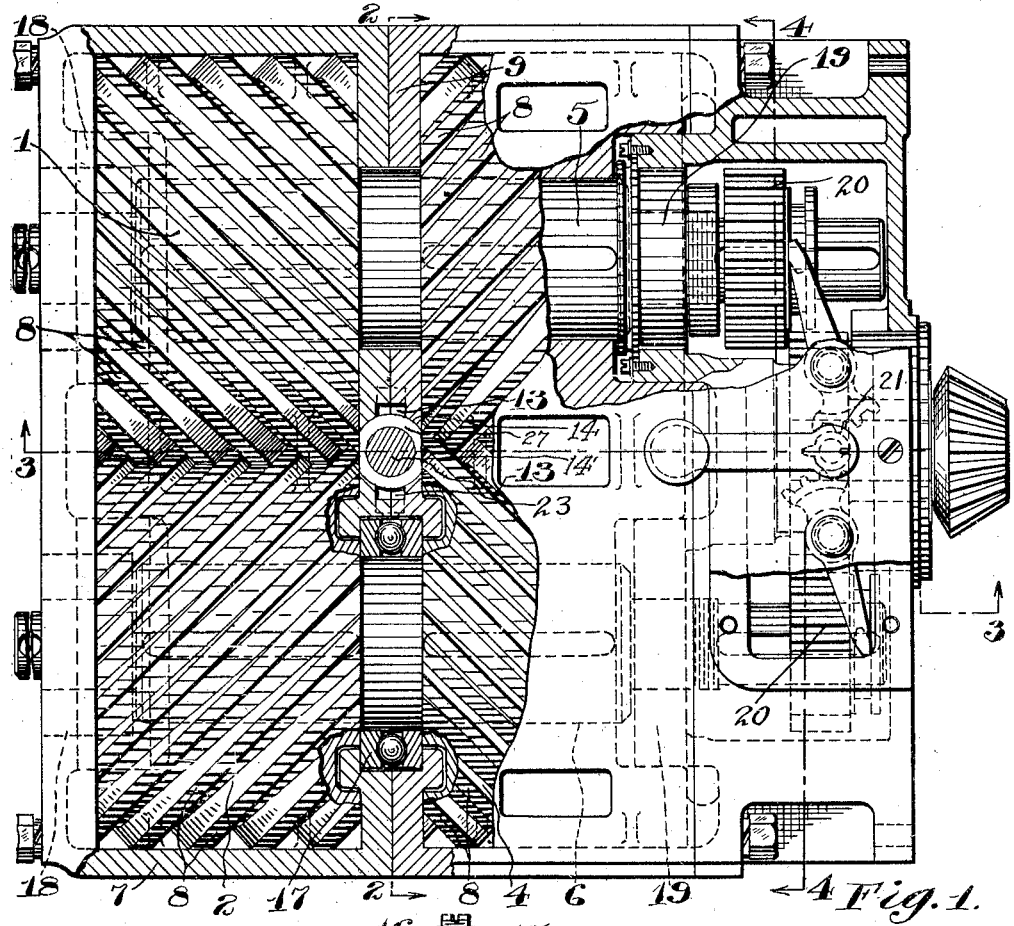
Fig. 1 is a plan view of the rotors, certain portions of the casing, etc. being broken away to facilitate illustration.

In this illustrative construction, it will be observed that I have disclosed a rotary engine of the so called Van Deventer type described in the patent to Van Deventer No. 996,169. As this type of motor is well known, it is believed that a detailed description of the same is unnecessary other than to say that it comprises a plurality of sets of intermeshing spiral rotors 1, 2, 3, 4, of which the rotors 1 and 3 are carried upon a single axle 5, while the rotors 2 and 4 are carried upon a parallel axle 6, the two sets of axles being suitably journaled in a casing 7 so that the rotors are enclosed thereby and the spiral teeth 8 on the rotors may intermesh.

In my improved construction, it will be observed, however, that the two rotors on each axle, namely, 1, 3 and 2, 4, are spaced apart longitudinally by a substantial interval, suitable bearings 9 herein being extended from the casing in between the rotors so that two distinct sets of meshing rotors 1, 2, and 3, 4, are provided, in which the rotors 1 and 2 cooperate and the rotors 3 and 4 cooperate, each as a distinct set and without the provision of any connecting mechanism between the same other than the spiral teeth 8.

Figure 2:
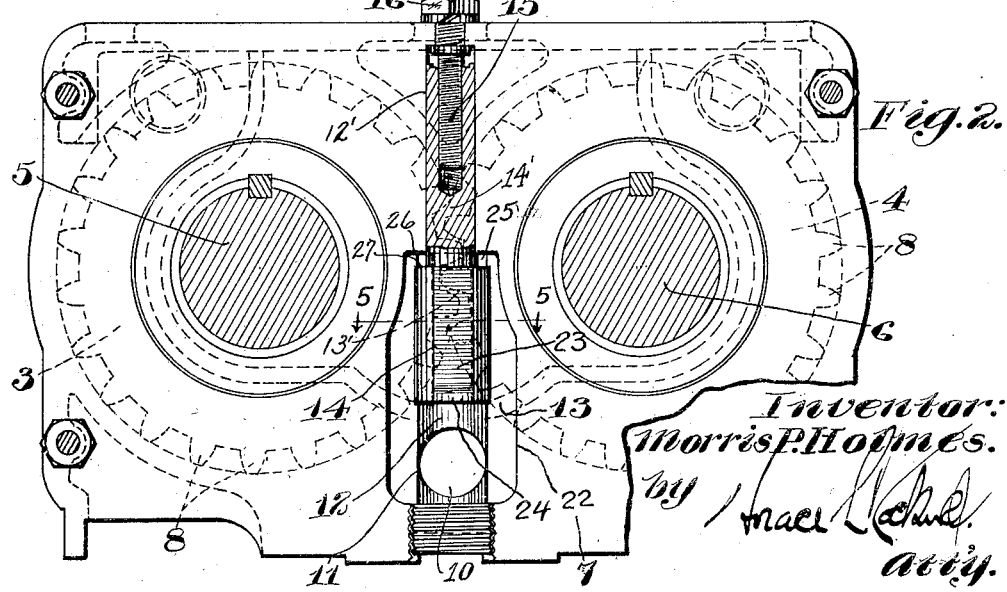
Fig. 2 is a sectional view taken substantially on line 2—2 of Fig. 1.
Figure 3:
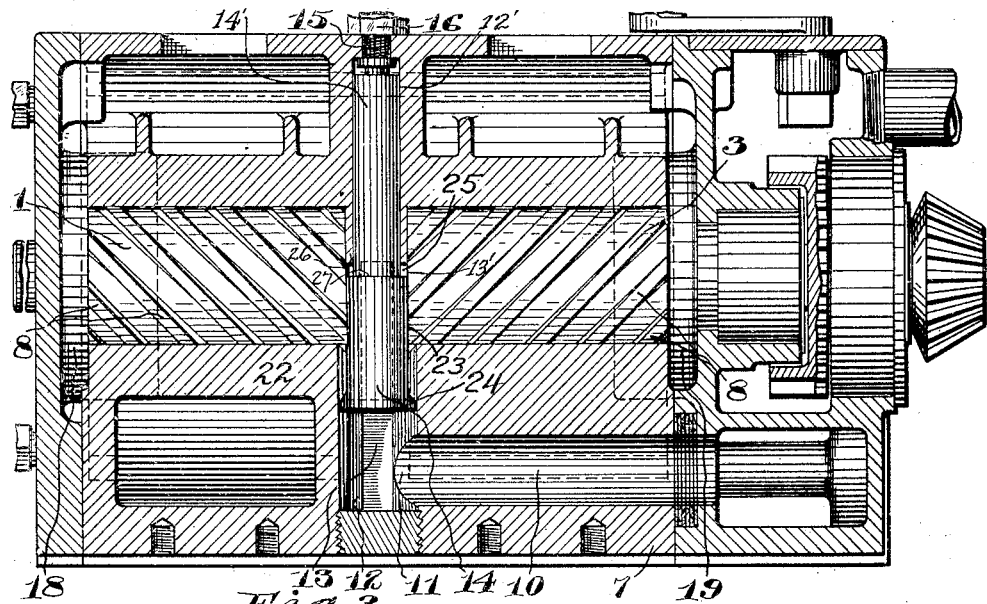
Fig. 3 is a sectional view taken substantially on line 3—3 of Fig. 1.
Figure 4:
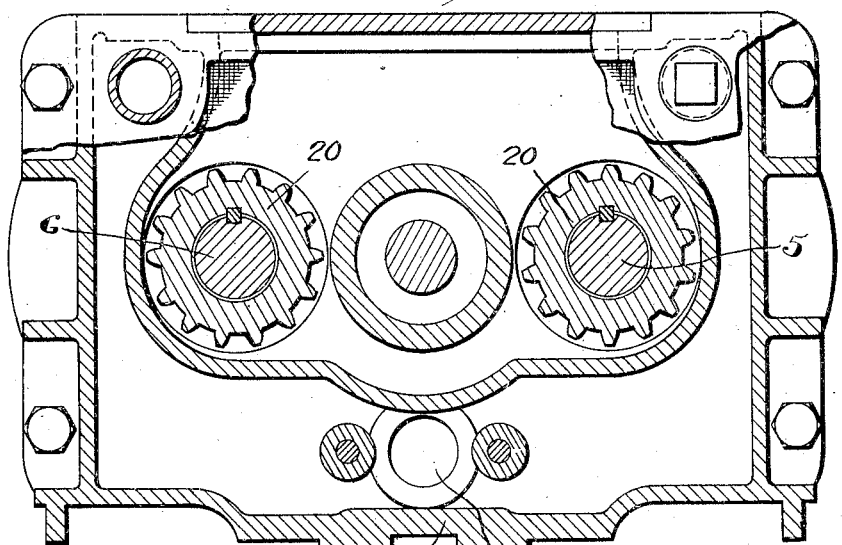
Fig. 4 is a sectional view taken substantially on line 4—4 of Fig. 1.
Figure 5:
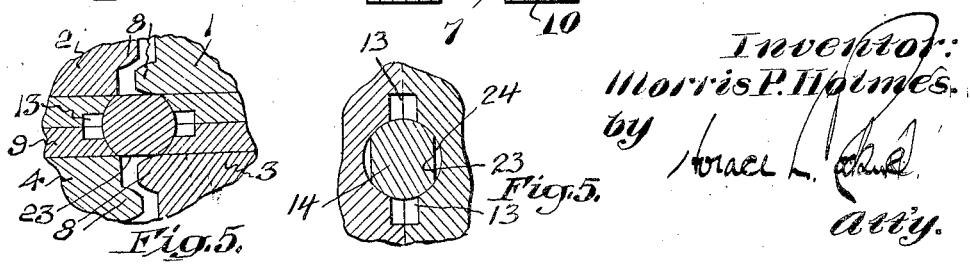
Fig. 5 is a detail sectional view of the valve taken on line 5—5 of Fig. 2.

It will also be observed that beneath the rotors and in the casing 7 I have provided a suitable passage 10 leading towards the middle of the interval between the rotors and communicating through a suitable port 11 with an upwardly extending bore or passage 12, preferably slightly wider than the port and extending upward, as shown in Fig. 2, to a point adjacent the line of mesh of the teeth of the rotors. From this point, a reduced bore 12′ extends upwardly as a guide for the valve stem 14'. A shoulder 26 is formed at the junction of the bores 12 and 12'. It will also be observed that as this passage 12 extends upwardly through the lower V-shaped housing 22 of the rotors, it retains its cylindrical cross section until the rotor chambers are encountered, when this passageway is intersected on opposite sides by the rotor chambers, as is shown in Figs. 1 and 3, and elongated ports 13' are thereby formed connecting the bore 12 and the rotor chambers. If desired, by any suitable machining process, such as broaching, the bore 12 may be shaped so that its cylindrical portion stops just before meeting the rotor chambers, and the bore above formed of a flattened cylinder shape, corresponding to the shape of the valve which is hereinafter described. It will, of course, be understood that the ports 13' will still be of the same construction as previously described. This method of construction will avoid the pockets shown at the upper end of the bore 12 in Fig. 3, but as these are sealed off from leakage of live fluid and soon become filled with pressure from the expansion pockets during rotation, their presence is immaterial. This passage 12 is also provided with a pair of longitudinally disposed slots or bypasses 13, at about 90° from the ports 13', which slots or passages are adapted to communicate by means of a passageway of variable area 25, hereinafter explained, with the upper ends of the ports 13', and so with the teeth 8 of the cooperating rotors of each set. The parts may be so formed that the upper ends of the ports 13' may extend to a point just above the line of mesh of the rotor teeth, there being no substantial loss of fluid in such a case due to the fact that the tooth pockets are then practically completely filled by the cooperating teeth or may terminate as low as at a point just below the point of mesh thereof, and be controlled by means of an adjustable cut-off regulating member 14. The member 14 is herein disposed vertically in the casing and vertically adjustable relative to the passages 13 and ports 13' and to the bore 12, for which it is at its lower end an air-tight fit, as later described, by means of the stem 14' preferably operatable from the exterior of the casing. A shoulder 27 is formed at the junction of the reduced stem 14' with the valve 14. The valve member 14 is preferably flattened on opposite sides, as shown at 23, to permit this member to slide past the rotors, but the lower end of the valve is preferably formed cylindrical for a short distance adjacent the bottom end thereof, as shown at 24, to close the passage 12 completely and prevent any flow of pressure fluid except through the bypasses, or passages, 13. As shown, this member 14 is connected by its stem 14' to a suitable adjusting screw 15, which is in turn normally held in place by locking means 16 and is adjustable from the top of the casing at will in such a manner as to move the member 14 up or down from the position shown in Fig. 2. When the member 14 is in its extreme upper position, it will be noted that the shoulder 27 between the outside edge of the valve 14 and the stem 14' will abut the shoulder 26, and that there will then be no communication between the passages 13 and the ports 13'. At this time, the flattened portions 23 of the valve member 14 form, in effect, a portion of the end walls of the rotor chambers, and make a tight closure therefor. When, however, the valve 14 is moved downwardly, there will be a passage 25 formed around the reduced stem 14' between the shoulder 26 in the casing and the shoulder 27 on the valve, through which communication between the passages 13 and the ports 13' leading to the rotor chambers will be established. It will be obvious that as the valve 14 is further depressed, not only will the area of the passage 25 connecting the passages 13 and the ports 13' be increased, but also this passage 25 will be extended in length in a direction tangential to the pitch circle of the rotor teeth, and thereby the period of communication of the expansion pockets located between the teeth, with the air supply, will be increased. This will result in causing cut-off, which is determined by the instant when the front edge of the rear tooth bounding one of the pockets passes beyond the lower end of the passage 25, i. e. the shoulder 27, to occur later in the revolution, and thereby the ratio of expansion may, within limits, be varied at will.

In the operation of my improved construction, it will be observed that by means of the adjusting member 15 the member 14 may be adjusted in such a manner as simultaneously to vary the cut-off of the set of rotors 1, 2, and the set of rotors 3, 4, and thereby enable each of these sets of rotors to be simultaneously controlled in such a manner as to enable the same to operate at varying pressures with highest efficiency, or to enable their speed to be regulated as desired. It will also be observed that due to the spaced arrangement of the rotors the same are balanced in their operation as desired, at the same time that it is made possible to eliminate the spur gears and the necessity for aligning the teeth, and also provide a single, conveniently operated, controlling mechanism for the two sets of rotors.

Obviously, in the use of my improvement, the rotors may be provided with suitable thrust or other bearings as may be needed. However, in this preferred form of my improvement, it will be observed that the members 9 act efficiently as spacing and bearing members between the different sets of rotors in conjunction with a single ball thrust bearing 17 disposed between the rotors 2 and 4, while the two shafts 5 and 6 are each suitably journaled in bearing members 18 and 19 carried on the casing. It will also be observed that any suitable reversing mechanism may be used in conjunction with the engine thus formed, such, for instance, as the reversing mechanism described and claimed in my copending application Serial No. 130,579, filed Nov. 10, 1916, and shown herein at 20, 21, but inasmuch as this mechanism does not form the subject matter of the present invention, a further description of the same is believed to be unnecessary.

While I have in this application specifically described one embodiment which my invention may assume in practice, it is to be understood that this form of the same is used for purposes of illustration and that the invention may be modified and embodied in various other forms without departing from its spirit or the scope of the appended claims.

What I claim as new and desire to secure by Letters Patent is:

1. In a rotary engine, a casing, a plurality of sets of intermeshing toothed rotors therein adapted to be actuated by the action of a pressure fluid on the teeth thereof, and a single means for varying the cut-off of each set.

2. In a rotary engine, a casing, a plurality of sets of intermeshing spiral toothed rotors therein adapted to be actuated by the action of a pressure fluid on the teeth carried thereby, and a single means for varying the cut-off of each set.

3. In a rotary engine, a casing, a plurality of sets of intermeshing spiral toothed rotors therein adapted to be actuated by the action of a pressure fluid on the teeth carried thereby, and simultaneously adjustable means for varying the cut-off of both sets.

4. In a rotary engine, a casing, a plurality of sets of longitudinally spaced intermeshing rotors therein, and cut-off controlling means disposed between said sets of rotors.

5. In a rotary engine, a casing, a plurality of sets of longitudinally spaced intermeshing rotors therein, and cut-off mechanism disposed between said sets of rotors and including a single adjustable member.

6. In a rotary engine, a casing, a plurality of sets of longitudinally spaced intermeshing rotors therein, and cut-off mechanism disposed between said sets of rotors and including oppositely located ports and a single controlling member therefor.

7. In a rotary engine, a casing, a plurality of sets of longitudnally spaced intermeshing rotors therein, and cut-off mechanism disposed between said sets of rotors and including oppositely located ports and a single controlling member therefor.

8. In a rotary engine, a casing, cooperating sets of spiral-toothed rotors rotatable within said casing on parallel axes and spaced apart along said axes, fluid supply means for said rotors, and bearings for said rotors including a thrust bearing between the rotors on one axis.

9. In a rotary engine, a plurality of cooperating sets of intermeshing spiral toothed rotors disposed in spaced relation on parallel axes, a casing enclosing the same and providing bearings therefor disposed between said sets, and cut-off mechanism disposed in the interval between their axes and between said bearings.

10. In a rotary engine, a plurality of cooperating sets of intermeshing spiral toothed rotors disposed in spaced relation on parallel axes, a casing enclosing the same, bearings for said rotors disposed between said sets of rotors and at their ends, and cut-off mechanism disposed in the interval between their axes including a supply passage having oppositely located ports disposed along the line of mesh of the cooperating rotor teeth and a movable member for varying the area of said ports.

11. In a rotary engine, a casing, a plurality of sets of longitudinally spaced intermeshing rotors therein, and cut-off mechanism disposed between said sets of rotors and including oppositely located ports and controlling means therefor for simultaneously controlling the cut-off of said ports while permitting a flow through both of said ports at the same time.

12. In a rotary engine, a plurality of sets of cooperating sets of spiral-toothed rotors, a fluid pressure supply passage, branch passages for conducting fluid pressure from said supply passage to said sets of rotors, and a member controlling the communication of said branch passages with said sets of rotors and adjustable to vary the communication to change the cut-off of said engine.

13. In a rotary engine, the combination with a pair of rotors each provided with a plurality of teeth cooperating to form between successive teeth pockets expanding in size upon rotation of the rotors, of an inlet port adapted to communicate directly with said pockets at their inception and a cut off mechanism adapted to vary the duration of the period of communication of each pocket with the fluid supply.

14. In a rotary engine, the combination with a pair of toothed rotors cooperating to form between their teeth pockets expanding in size upon rotation of the rotors, of a fluid inlet port communicating directly with the expansion pockets and having a bounding edge adjustable in a direction tangential to the pitch circle of the rotor teeth.

15. In a rotary engine, the combination with a pair of toothed rotors cooperating to form between their teeth pockets expanding in size upon rotation of the rotors, of a fluid inlet port overrun by the rotor teeth and provided with a bounding edge adjustable to vary time of cut off.

16. A rotary engine comprising a pair of rotors each provided with a plurality of spirally disposed and intermeshing tooth blades cooperating to form expansion pockets, and fluid inlet means comprising cut off mechanism adapted to vary the duration of the period of communication of each expansion pocket with the fluid supply.

17. A rotary engine comprising a pair of rotors each provided with teeth cooperating to form a plurality of spirally arranged expansion pockets and intermeshing with each other, and inlet means comprising a cut off mechanism whereby the duration of the period of communication of each expansion pocket with the fluid supply may be varied.

18. A rotary engine having a pair of rotors each provided with a plurality of spirally disposed intermeshing tooth blades which cooperate to form expansion pockets, and fluid inlet means comprising an inlet port overrun by the rotor tooth blades and having an adjustable bounding edge whereby the time of cut off may be varied.

19. In a rotary engine, the combination with a casing having a pair of toothed rotors cooperating to form between successive teeth pockets expanding in size upon rotation of the rotors, of an inlet port opening into the interior of said casing at a point to communicate with said expanding pockets at their inception, and means whereby one dimension of said port may be varied to change the period of the latter's communication with each of said pockets.

20. In a rotary motor, a plurality of rotors, at least two elements associated with each of said rotors and serving as abutments for the action of fluid pressure, and means for admitting fluid pressure to said rotors and elements to effect rotation thereof comprising port means over-run by said elements and having an edge thereof adjustable to vary the time of cut-off.

21. In a rotary motor, a casing, a rotor therein, a plurality of elements associated with said rotor and extending between the body of said rotor and the wall of said casing, means constituting an abutment cooperating with said elements to effect the formation of pockets expanding in volume as said rotor rotates, fluid supply means comprising a port over-run by said elements, and means for increasing or decreasing the length of said port in the direction of rotation of said rotor.

22. In a rotary motor, a casing, a rotor therein, a plurality of elements associated with said rotor and extending between the body of said rotor and the wall of said casing, means constituting an abutment cooperating with said elements to effect the formation of pockets expanding in volume as said rotor rotates, fluid supply means comprising a port over-run by said elements, and means for varying the ratio of the length of said port to the distance between adjacent elements of said rotor.

23. In a rotary engine, a plurality of rotors provided upon their peripheries with intermeshing tooth blades cooperating upon rotation of said rotors to form pockets expanding in size, fluid supply means comprising a passage communicable with said pockets adjacent the points of their inception, a valve movable in said passage and of the same cross-sectional area as said passage, passage means connecting the portions of said passage at opposite ends of said valve, means for adjusting said valve to vary the period of communication of said expanding pockets with the fluid pressure supply, and exhaust means for said engine.

In testimony whereof I affix my signature.

MORRIS P. HOLMES.